US012807739B2

(12) United States Patent
Sirak et al.

(10) Patent No.: US 12,807,739 B2
(45) Date of Patent: Nov. 24, 2026

(54) PROCESS FOR PREPARING LOW MOLECULAR WEIGHT POLYACRYLATES AND PRODUCTS THEREOF

(71) Applicant: Evonik Operations GmbH, Essen (DE)

(72) Inventors: Sofia Sirak, Plymouth Meeting, PA (US); Gaël Mosnier, Biblis (DE); Claudia Meister, Darmstadt (DE); Sascha Hirm, Buettelborn (DE)

(73) Assignee: Evonik Operations GmbH, Essen (DE)

( * ) Notice: Subject to any disclaimer, the term of this patent is extended or adjusted under 35 U.S.C. 154(b) by 544 days.

(21) Appl. No.: 18/291,546

(22) PCT Filed: Jun. 29, 2022

(86) PCT No.: PCT/EP2022/067821
§ 371 (c)(1),
(2) Date: Jan. 23, 2024

(87) PCT Pub. No.: WO2023/006322
PCT Pub. Date: Feb. 2, 2023

(65) Prior Publication Data

US 2025/0002614 A1 Jan. 2, 2025

(30) Foreign Application Priority Data

Jul. 29, 2021 (EP) .................................... 21188379

(51) Int. Cl.

| | |
|---|---|
| ***C08F 2/06*** | (2006.01) |
| ***C08F 2/00*** | (2006.01) |
| ***C08F 2/38*** | (2006.01) |
| ***C08F 20/14*** | (2006.01) |

(52) U.S. Cl.
CPC ................ *C08F 2/06* (2013.01); *C08F 2/001* (2013.01); *C08F 2/38* (2013.01); *C08F 20/14* (2013.01); *C08F 2400/02* (2013.01)

(58) Field of Classification Search
USPC ....................................................... 526/329.7
See application file for complete search history.

(56) References Cited

U.S. PATENT DOCUMENTS

| | | | |
|---|---|---|---|
| 3,485,808 A | 12/1969 | Wiesner et al. | |
| 2004/0024132 A1 | 2/2004 | Chiefari et al. | |

FOREIGN PATENT DOCUMENTS

| | | | |
|---|---|---|---|
| CN | 1023487 | 1/1994 | |
| CN | 102311518 | 9/2013 | |
| CN | 104448080 | 3/2015 | |
| CN | 105175592 | 12/2015 | |
| WO | 97/18247 | 5/1997 | |
| WO | 97/47661 | 12/1997 | |
| WO | 98/01478 | 1/1998 | |
| WO | 98/40415 | 9/1998 | |
| WO | 99/10387 | 3/1999 | |
| WO | 2004/083169 | 9/2004 | |
| WO | WO 2021/114187 A1 * | 6/2021 | .......... C10M 107/28 |

OTHER PUBLICATIONS

Donald E. Roberts, "Heats of Polymerization. A Summary of Published Values and Their Relation to Structure", Journal of Research, vol. 44, Mar. 1950, pp. 221-232.
Drache et al., "Modeling RAFT Polymerization Kinetics via Monte Carlo Methods: Cumyl Dithiobenzoate Mediated Methyl Acrylate Polymerization", Polymer, vol. 46, No. 19, available online Jun. 9, 2005, pp. 8483-8493.
European Search Report received for European Patent Application No. 21188379.8, mailed on Jan. 20, 2022, 7 pages.
George Odian, "Principles of Polymerization", Process Conditions, 4th edition, Wiley-Interscience, Jan. 2004, pp. 297-309.
International Search Report received for PCT Application No. PCT/EP2022/067821, mailed on Oct. 10, 2022, 6 pages.
Liang et al., "Reduced Branching in Poly(Butyl Acrylate) via Solution Radical Polymerization in n-Butanol", Macromolecules, vol. 44, No. 15, published Jul. 14, 2011, pp. 5843-5845.
Wang et al., "Controlled/"Living" Radical Polymerization. Atom Transfer Radical Polymerization in the Presence of Transition-Metal Complexes", J. Am. Chem. Soc, vol. 117, Feb. 16, 1995, pp. 5614-5615.
Wang et al., "Controlled/"Living" Radical Polymerization. Halogen Atom Transfer Radical Polymerization Promoted by a Cu(I)/Cu(II) Redox Process" Macromolecules, vol. 28, Aug. 14, 1995, pp. 7901-7910.
Written Opinion received for PCT Application No. PCT/EP2022/067821, mailed on Oct. 10, 2022, 11 pages.

* cited by examiner

*Primary Examiner* — Fred M Teskin
(74) *Attorney, Agent, or Firm* — Grüneberg Global IP, PLLC

(57) ABSTRACT

A process is developed for large scale manufacturing of low molecular weight polyacrylates via free radical polymerization. The process includes a first reaction mixture including a solvent or mixture of solvents; a second reaction mixture including a monomer composition of $C_1$-$C_4$ alkyl acrylates or a mixture thereof; a third reaction mixture including a solvent or a mixture of solvents, an initiator and a chain transfer agent; and a free radical polymerization. With the process, low molecular weight polyacrylates are obtained with resulting monomer conversion rates of more than 96% and weight average molecular weights below 15,000 g/mol.

17 Claims, No Drawings

PROCESS FOR PREPARING LOW MOLECULAR WEIGHT POLYACRYLATES AND PRODUCTS THEREOF

CROSS-REFERENCE TO RELATED APPLICATIONS

This application is a National Stage entry under § 371 of International Application No. PCT/EP2022/067821, filed on Jun. 29, 2022, and which claims the benefit of priority to European Patent Application No. 21188379.8, filed on Jul. 29, 2021. The content of each of these applications is hereby incorporated by reference in its entirety.

BACKGROUND OF THE INVENTION

Field of the Invention

The invention relates to a process, suitable for large scale manufacturing, for preparing low molecular weight polyacrylates via free radical polymerization. With the inventive process, low molecular weight polyacrylates are obtained with resulting monomer conversion rates of more than 96% and weight-average molecular weights below 15,000 g/mol.

Description of Related Art

Polyacrylates are useful as end products or intermediates in a wide variety of applications including coatings, textiles, adhesives, sealants, oil additives, and other specialty additives. Polyacrylates can be synthesized by free radical or anionic polymerization. Free radical techniques are the most common method because anionic polymerization techniques require high monomer purity and very low temperatures.

Producing polyacrylates via bulk polymerization would be advantageous because of the high final polymer content and minimal contamination or unnecessary solvents. Unfortunately, bulk polymerization processes involving acrylates are problematic and difficult to accomplish on a large scale since polymerizations can be very difficult to control. These polymerizations involve high heat of reaction (i.e. highly exothermic) and the increasing solution viscosity and tendency to gel makes heat dissipation very difficult during the polymerization process. Even with good temperature control systems in place, there are still risks of "runaway" or uncontrolled reactions. Therefore, polyacrylates for nonrigid applications are typically made via solution or emulsion free radical polymerizations at low monomer concentrations because the large amount of solvent can help dissipate heat. (Odian George; Principles of Polymerization, 4th ed; Wiley-Interscience, 2004, pp 297-309). Temperature control is important because radical reaction kinetics and reaction temperature can directly affect final polymer properties and product performance, so it is crucial to have a process where heat released from reaction does not exceed the heat removal capability.

Along with low polymer concentrations, exothermic behavior can be controlled on larger scale polyacrylate polymerization processes by carrying out the polymerization to low conversion, in stages, or in a continuous process. All of these processes do not require high levels of monomer conversion and help control heat released during polymerization by limiting the amount of monomer that is consumed to produce the final product. These methods are disadvantageous since they necessitate poor reactor space utilization and require removal of the unreacted monomer and additional processing time. Continuous processes are less desirable in specialty chemicals manufacturing because the continuous reactor is typically used for the production of only one product, and the flexibility to produce multiple products in the same reactor as in batch processes is lost. Furthermore, batch reactors are economically favorable because of the relative simplicity of the reactor equipment.

In particular, acrylates with shorter alkyl chains such as methyl acrylate, ethyl acrylate, butyl acrylate have higher heats of polymerization compared their methacrylate counterparts or acrylates bearing longer alkyl chains (Roberts, D. E., Heats of Polymerization. A Summary of Published Values and Their Relation to Structure. Journal of Research of the National Bureau of Standards, 1950. 44: p. 221-32). This makes these types of monomer the most difficult to polymerize on large scale and in high concentrations with high monomer conversion. Therefore, it is a common practice to polymerize these monomers with comonomers having lower heats of polymerization to have better thermal control during the polymerization process. Even though these copolymers are more scalable, there is a great disadvantage to require the use of comonomers that will alter the desired final polymer properties.

CN102311518B describes polymerization of monomers such as methyl acrylate using a high-temperature continuous polymerization. The process involves multiple steps with a final polymer conversion of 55-90% and a total acrylic acid ester monomer content of less than 5%. This process is less suitable for producing a polyacrylate with high conversion.

U.S. Pat. No. 3,485,808 provides a process to control the heat of reaction by adding additional water during suspension or emulsion polymerization. The copolymers are based on acrylates, acrylonitrile, vinyl chloroethyl ether, vinyl chloroacetate, styrene, and mixtures thereof. This process requires that the polymerization be carried out in suspension or emulsion polymerization requiring water is present.

CN1023487C discloses a process to produce (meth)acrylate-based polymers via solution polymerization and using a single or twin-screw extruder to complete polymerization and remove solvent to obtain polymer pellets.

CN104448080A discloses a process for preparing a poly (butyl acrylate) homopolymer by solution polymerization in toluene, wherein the toluene is heated at reflux (110.6 °C), followed by a distillation step to remove the solvent under pressure and isolation of the homopolymer. No indication is given on the reaction yield or on the residual monomer content. Using a reflux process on a large industrial scale is unfavorable since additional expensive equipment such as a reflux condenser is required. Furthermore, a lowered batch level is also required for a reflux process and the reflux condenser requires frequent cleaning due to the polymer build up bringing additional costs from time, labor, and unused production time.

Liang Kun et al in the publication "Reduced branching in poly(butylacrylate) via solution radical polymerization in n-butanol" disclose a process for preparing a poly (butyl acrylate) under starved-feed high-temperature (>100 °C) semibatch reaction conditions (see abstract). In this work, it is demonstrated that the branching level in poly(butylacrylate) produced via starved-feed semibatch solution free-radical polymerization is reduced 5-fold through introduction of a solvent capable of H-bonding to the acrylate carbonyl group, such as n-butanol. It is shown that a significant decrease in poly(butyl acrylate) branching levels for solution polymerization in BuOH is achieved in comparison to xylene at higher temperature industrially relevant conditions, which leads to the production of higher molecular weight polymer at identical synthesis conditions. It is thus taught to conduct the polymerization reaction at high temperature and in a H-bonding solvent.

It is indeed known in the art that one of the most effective ways to control molecular weight is to polymerize at high temperatures, especially temperatures greater than 110 °C. (Ind. Eng. Chem. Res., Vol. 44, No. 8, 2005). In this journal article, the authors state on page 2506 that "one of the most effective ways to control molecular weight is to polymerize at temperatures greater than 120 °C at reasonable initiator levels in a starved-feed reactor where the monomer and initiator are continuously added using a semibatch feeding strategy".

The present PhD thesis (No. 3460 (2006)—"*High-temperature radical polymerization of methyl methacrylate in a continuous pilot scale process*"—Author: Philip Nising—École polytechnique fédérale de Lausanne) deals with the high temperature polymerization of methyl methacrylate (PMMA) in a continuous pilot scale process. The major aim is to investigate the feasibility of a polymerization process for the production of PMMA molding compound at temperatures in the range from 140 °C to 170 °C. It is taught that increasing the process temperature has the advantage of decreasing molecular weight and viscosity of the reaction mixture, thus allowing to reduce the addition of chain transfer agent and to increase the polymer content in the reactor. At the same time, the reaction rates are higher and the devolatilization is facilitated compared to low conversion polymerizations. Altogether, it leads to an improved space time yield of the process. Thus, this document also teaches to work at high polymerization temperatures to reach high monomer conversion rates.

Therefore, it would be interesting to develop a process for preparing polyacrylates derived from acrylates with shorter alkyl chains and having a low weight average molecular weight, which could be performed in a one-step reaction, avoiding any additional step such as a distillation to remove the solvent of the reaction or a purification step. Furthermore, in order to lower the production costs and for safety reasons, it would be desirable to conduct the polymerization process at lower temperature than the usual high-temperature polymerization processes used to reach low molecular weight polymers. The process should allow a high conversion of acrylate monomers with shorter alkyl chains on industrial scale.

SUMMARY OF THE INVENTION

After thorough investigation, the inventors of the present invention have surprisingly found that the process as defined herein solves the above technical problem as it provides a scalable method for the preparation of low molecular weight polyacrylates with weight average molecular weights below 15,000 g/mol. The process of the invention is a batch process, leading to excellent monomer conversion rates of more than 96%. These high conversion rates were unexpected as it is well-known in the art that production of low molecular weight polymers usually needs high temperature as illustrated in the prior art documents cited above. Advantageously, a distillation step at the end of the polymerization is avoided as the process of the present invention can be conducted at a high concentration of monomers, whereas the known prior art processes usually have monomer concentrations of not more than 10%. The described process is conducted at lower reaction temperature than the usual high temperature processes for low molecular weight polymers, thus limiting an increase in reaction solution viscosity. This allows heat dissipation during the polymerization process because the tendency to gel stays acceptable.

Therefore, in a first aspect, the present invention relates to a process as defined herein.

In a second aspect, the present invention relates to the product obtained or obtainable by the process according to the present invention.

DETAILED DESCRIPTION OF THE INVENTION

Process of the Invention

In a first aspect, the invention relates to a process for preparing a polyacrylate, the process comprising the steps of (i) providing a first reaction mixture comprising a solvent or a mixture of solvents, (ii) providing a second reaction mixture comprising a monomer composition consisting of a monomer selected from $C_1$-$C_4$ alkyl acrylates or a mixture thereof, (iii) providing a third reaction mixture comprising a solvent or a mixture of solvents, at least one initiator and at least one chain transfer agent, (iv) initiating free radical polymerization, wherein the free radical polymerization is performed as solution polymerization by adding the first reaction mixture of step (i) to the second reaction mixtures of step (ii) and of step (iii) to obtain the polyacrylate, wherein the amount of the monomer composition is from 20% to 80% by weight, based on the total weight of the reaction mixtures of step (i), step (ii) and step (iii), wherein the radical polymerization step (iv) is conducted at a temperature of 50 to 100 °C, wherein the solvent or mixture of solvents of step (i) and step (iii) is not at reflux, and wherein the polyacrylate has a weight-average molecular weight in the range of 1,000 to 15,000 g/mol, measured by gel permeation chromatography using poly(methyl-methacrylate) calibration standards according to DIN 55672-1.

Indeed, the inventors of the present invention have surprisingly found that the polymerization process as defined above allows to prepare polyacrylates with excellent monomer conversion rates of more than 96%, based on the total weight of the monomer composition. Consequently, the process does not require removal of the unreacted monomer and has therefore shorter processing times as processes of the prior art. There is also no need of an expensive condenser unit, and no need to conduct a distillation step under pressure, which is advantageous at industrial scale for safety reasons.

Although the process of the present invention involves a complex polymerization of short chain acrylates, the inventors have successfully developed a process easily reproducible on a large scale and well manageable: it does not involve high heat of reaction and the reaction solution viscosity and tendency to gel stays acceptable, so that the heat dissipation during the polymerization process is possible.

According to the invention, the total amount of the monomer composition (i) is from 20% to 80% by weight, based on the total weight of the reaction mixtures of step (i), step (ii) and step (iii). In contrast, as shown for example in CN102311518B, the known prior art processes usually have monomer concentrations of not more than 10%, which results in additional distillation step with removal of the reaction solvent. Therefore, it was unexpected to reach excellent performances in the polymerization process conducted using high concentrations of monomers as defined herein.

According to a preferred embodiment of the invention, the resulting polyacrylate obtained or obtainable by the process according to the present invention has a weight-average molecular weight in the range of 2,000 to 12,000 g/mol, more preferably 2,500 to 10,000 g/mol, even more preferably 3,000 to 10,000 g/mol, most preferably 3,000 to 6,000 g/mol, according to DIN 55672-1.

In the present invention, the weight-average molecular weights ($M_w$) and the number-average molecular weights ($M_n$) of the polyacrylates were determined by gel permeation chromatography (GPC) using poly(methyl-methacrylate) calibration standards according to DIN 55672-1 using the following measurement conditions:

Column: the column set consists of a precolumn and 5 SDV columns as disclosed in Table 1:

TABLE 1

| No. | Type | Dimension |
|---|---|---|
| Precolumn | SDV 10μ | 8 × 50 mm |
| Column 1 | SDV LXL 10μ | 8 × 300 mm |
| Column 2 | SDV LinL 10μ | 8 × 300 mm |
| Column 3 | SDV 100 Å 10μ | 8 × 300 mm |
| Column 4 | SDV 100 Å 10μ | 8 × 300 mm |
| Column 5 | KF-800D | 8 × 100 mm |

Instruments: Agilent 1100 Series Pump; PSS SECcurity Inline-Degaser; Agilent 1260 Series Autosampler; Agilent 1100 Series RI-Detector; Agilent 1260 Series UV-Detector; Techlab column oven Oven temperature: 35 °C Standards: poly(methyl-methacrylate) (so called PMMA) calibration standards Eluent: tetrahydrofuran (THF)

Flowrate: 1 mL/min

Injected volume: 100 μL

Detection: RI at a temperature of 35 °C and UV at a wavelength of 239 nm

The process according to the present invention allows the preparation of polyacrylates with a very low degree of cross-linking and a narrow molecular weight distribution. The polymerization control and the narrow molecular weight distribution are reflected in the polydispersity index of the polyacrylates. The process according to the invention allows to prepare polyacrylates with a polydispersity index preferably in the range of 1.0 to 4.0, more preferably 1.5 to 3.0, even more preferably 1.5 to 2.5. The polydispersity index is defined as the ratio of weight-average molecular weight to number-average molecular weight ($M_w/M_n$).

Monomers

According to the present invention, the expression "based on the monomer composition" or "based on the monomer composition of step (ii)" or "based on the monomer composition (ii)" also means "based on the total weight of monomers".

The monomers used in the process according to the present invention are $C_1$-$C_4$ alkyl acrylates.

The term "$C_1$-$C_4$ acrylates" refers to esters of acrylic acid and straight chain or branched alcohols having 1 to 4 carbon atoms. The term encompasses individual acrylic esters with an alcohol of a particular length, and likewise a mixture of acrylic esters with alcohols of different lengths. The $C_1$-$C_4$ alkyl acrylates are selected from the group consisting of methyl acrylate, ethyl acrylate, n-propyl acrylate, iso-propyl acrylate, n-butyl-acrylate, iso-butyl acrylate, tert-butyl acrylate, sec-butyl acrylate, or a mixture thereof, preferably from the group consisting of methyl acrylate, ethyl acrylate, n-propyl acrylate and iso-propyl acrylate, Most preferably, the $C_1$-$C_4$ alkyl acrylate is methyl acrylate.

Polymerization Step (iv)

According to the present invention, the polymerization step (iv) is a radical polymerization in solution.

Standard free-radical polymerization is detailed, inter alia, in Ullmann's Encyclopedia of Industrial Chemistry, Sixth Edition. In general, a polymerization initiator and optionally a chain transfer agent are used for this purpose.

The polyacrylates of the invention can be obtained via ATRP methods. This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP.

Furthermore, the polyacrylates of the invention can also be obtained via RAFT methods. For example, the RAFT method is described in detail in WO 98/01478 and WO 2004/083169.

The radical polymerization step (iv) is preferably performed at a temperature of 50 °C to 100 °C, more preferably 60 °C to 100 °C, even more preferably 70 °C to 90 °C.

In the polymerization step (iv), the reaction mixtures of step (ii) and step (iii) are added by continuous addition to the reaction mixture of step (i) over a period of time from preferably 1 to 10 hours, more preferably 3 to 8 hours, even more preferably 4 to 6 hours. Preferably, the radical polymerization reaction is conducted at atmospheric pressure.

Preferably, the reaction mixture of step (iv) is mixed for at least one additional hour after full addition of the reaction mixtures (ii) and (iii), preferably at least 2 hours, more preferably at least 5 hours. This allows to fully convert the remaining monomers into the polymer in step (iv) and reach high monomer conversion rates.

According to the process of the present invention, the first reaction mixture of step (i) comprises one solvent or a mixture of solvents as described below, preferably consists of one solvent or a mixture of solvents as described below.

According to the process of the present invention, the second reaction mixture of step (ii) consists of a monomer selected from $C_1$-$C_4$ alkyl acrylates or a mixture thereof, as described above.

According to the process of the present invention, the third reaction mixture of step (iii) comprises a solubilizing carrier medium or solvent, one or more radical initiators and one or more chain transfer agents, as described below.

In the present invention, "one or more" compounds means "one compound or a mixture thereof".

According to the present invention, the total amount of monomer composition in the reaction mixture is between 20 and 80% by weight, preferably 20 to 70% by weight, more preferably 20 to 60% by weight, even more preferably 20 to 50% by weight, based on the total weight of the reaction mixture (namely, based on the total weight of the reaction mixtures (i), (ii) and (iii)).

The polymerization step (iv) is preferably carried out in a nonpolar solvent. These solvents may be used individually and as a mixture. Preferably, the solubilizing carrier medium or solvent used in the reaction mixture (i) or in the reaction mixture (iii) is selected from cycloaliphatic, aliphatic or aromatic hydrocarbons. Examples for aromatic hydrocarbons are benzene, toluene, xylene, ethylbenzene, trimethyl benzene, ethyl toluene or a mixture thereof. Examples for cycloaliphatic hydrocarbons are cyclohexane, methyl cyclohexane, cycloaliphatic terpenes, or a mixture thereof. Examples for aliphatic hydrocarbons are n-pentane, n-hexane, n-heptane, 1-decene and aliphatic terpenes.

In a preferred embodiment, the solvent used in the first reaction mixture (i) or in the third reaction mixture (iii) is a cycloaliphatic or aliphatic or aromatic hydrocarbon or a mixture thereof, preferably cyclohexane, xylene, toluene or a mixture thereof, most preferably toluene.

According to the present invention, the solvent or solvent mixture of step (i) and step (iii) are not at reflux during the polymerization step (iv). The term "reflux" means the continuous boiling and condensation of a reaction mixture. During reflux, the reaction vessel is heated vigorously over the course of the reaction; the vessel is connected to a condenser to condense the vapor produced from the boiling reaction mixture. Thus, the solvent or solvent mixture of step (i) or step (iii) has a boiling point above the temperature of the radical polymerization reaction step (iv). Preferably, the solvent or solvent mixture of step (i) and step (iii) have a boiling point of 101 °C or more, preferably 105 °C or more, more preferably in the range of from 101 °C to 300 °C, most preferably from 105 °C to 200 °C Surprisingly, even at a low polymerization reaction temperature and using these reaction conditions, the inventors were able to synthesize at high yields and low residual monomer content the $C_1$-$C_4$ polyacrylates with low weight-average molecular weights.

Preferably, the reaction mixture (iii) comprises one or more radical initiators. Suitable radical initiators are, for example, azo initiators, such as azobis-isobutyronitrile (AIBN), 2,2'-azobis (2-methylbutyronitrile) (AMBN) and 1,1-azobiscyclohexanecarbonitrile, and peroxy compounds such as methyl ethyl ketone peroxide, acetylacetone peroxide, dilauryl peroxide, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-3,5,5-trimethylhexanoate, dicumyl peroxide, 1,1-bis (tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate. Preferably, the radical initiator comprised in the reaction mixture (ii) is 2,2'-azobis (2-methylbutyronitrile).

Preferably, the total amount of radical initiator, relative to the total weight of the monomer mixture (second reaction mixture (ii)), is 0.1 to 7% by weight, more preferably 0.1 to 5% by weight, most preferably 0.2 to 4% by weight.

More preferably, the full amount of radical initiator is included in the third reaction mixture (iii) and the radical initiator is added over the course of the polymerization reaction (step (iv)).

According to another preferred embodiment of the present invention, the radical initiator may be added in several steps over the course of the polymerization reaction. More preferably in two steps, in which case, one first part of the radical initiator is in the reaction mixture of step (iii) to initiate radical polymerization and a second part of the radical initiator is added after full addition of the reaction mixtures of step (ii) and step (iii) to the first reaction mixture of step (i) in the polymerization step (iv). Even more preferably, the first part of radical initiator in the reaction mixture of step (iii) is from 0.05 to 6.5% by weight, even more preferably 0.05 to 4.5% by weight, most preferably 0.15 to 3.5% by weight, relative to the total weight of the monomer mixture (ii), and the second part of radical initiator is from 0.05 to 0.5% by weight of radical initiator and is added after full addition of the reaction mixtures of step (ii) and step (iii) to the reaction mixture of step (i) in the polymerization step (iv).

Most preferably, when the radical initiator is added in two steps, the reaction mixture of step (iv) is preferably mixed for at least one additional hour after addition of the second part of radical initiator, more preferably at least 2 hours, even more preferably at least 5 hours, most preferably at least 10 hours. This allows to fully convert the remaining monomers into the polymer in step (iv) and reach high monomer conversion rates.

The reaction mixture of step (iii) comprises a chain transfer agent or a mixture thereof. It is well-known in the art that a good way to control the molecular weight of a polymer chain is to use chain transfer agents during the polymerization synthesis. Chain transfer agents are molecules with a weak chemical bond which facilitates the chain transfer reaction. During the chain transfer reaction, the radical of the polymer chain abstracts a hydrogen from the chain transfer agent, resulting in the formation of a new radical on the sulfur atom of the chain transfer agent capable of further propagation. Common chain transfer agents are organic compounds comprising SH groups such as n-butyl mercaptan, n-octyl mercaptan, n-dodecyl mercaptan, tert-dodecyl mercaptan, thioglycolic acid, butylthiol glycolate, and octylthiol glycolate or a mixture thereof. Preferably, the chain transfer agent is n-dodecyl mercaptan, tert-dodecyl mercaptan, thioglycolic acid or a mixture thereof. Most preferably, n-dodecyl mercaptan or thioglycolic acid.

Preferably, the total amount of chain transfer agent, relative to the total weight of the monomer mixture (ii), is 0.01 to 10% by weight, more preferably 0.1 to 10% by weight, most preferably 0.5 to 10% by weight.

Polymethyl Acrylates of the Invention

The present invention also relates to a polymethyl acrylate obtained or obtainable by the process as defined in the present invention. The polymethyl acrylate obtained by the process of the invention is a random copolymer or a homopolymer with a weight average molecular weight in the range of 1,000 to 12,000 g/mol according to DIN 55672-1 and a polydispersity index in the range of 1.5 to 2.5.

Preferably, the polymethyl acrylate obtained by the process according to the invention has a weight average molecular weight in the range of 2,000 to 12,000 g/mol, more preferably 2,500 to 10,000 g/mol, even more preferably 3,000 to 10,000 g/mol, most preferably 3,000 to 6,000 g/mol, according to DIN 55672-1, and a polydispersity index in the range of 1.5 to 2.5.

Preferably, the polymethyl acrylate obtained or obtainable by the process according to the present invention has a kinematic viscosity $KV_{100}$ of less than 10 $mm^2/s$, more preferably less than 5 $mm^2/s$, even more preferably less than 3.5 $mm^2/s$, according to ASTM D445.

The polymethyl acrylate obtained or obtainable by the process as defined in the present invention has a low degree of cross-linking as shown by no visible gels in the final product.

Experimental Part

The invention is further illustrated in detail hereinafter with reference to examples and comparative examples, without any intention to limit the scope of the present invention.

ABBREVIATIONS $KV_{100}$ kinematic viscosity at 100 °C, measured according to ASTM D445

$M_n$ number-average molecular weight $M_w$ weight-average molecular weight

PDI polydispersity index, molecular weight distribution calculated via $M_w/M_n$ GPC gel permeation chromatography Test Methods:

The weight-average molecular weights ($M_w$) and the number-average molecular weights ($M_n$) of the polyacrylates are determined by gel permeation chromatography (GPC) using poly(methyl-methacrylate) calibration standards according to DIN 55672-1 using the measurement conditions as described previously and in Table 1. Determination of weight average molecular weights is done using the polymer peak of the GPC chromatogram, not the full elution.

The kinematic viscosities of the polymers were measured according to ASTM D445 with no deviations.

Residual methyl acrylate was determined using a calibrated high-performance liquid chromatography method.

Gelation test: Gelation was checked by visual observation by slowly pouring the finished example into another container and observing that the sample flows in a uniform way and that no large particulates are seen. Gelation was checked after 1 week and after 2 weeks of storage time, no gelation of the final polymer is observed.

Comparative Example 1

The comparative example was prepared on small scale as a highly exothermic reaction would be expected. 12 grams of methyl acrylate and 34 grams of toluene were placed in a round bottom flask. 1.9 grams of chain transfer agent, thioglycolic acid, was also added to the reaction flask. The reaction mixture was heated to 80 °C. Once the reaction temperature reached 80 °C, 0.7 grams of initiator, 4,4'-azobis (4-cyanovaleric acid) was added to the reaction flask. Within 30 seconds of addition, the temperature increased by 10 °C, and within a few minutes half of the reaction volume had evaporated. The uncontrolled reaction was stopped.

INVENTIVE EXAMPLES

Inventive Example 1

365 grams of toluene were charged into a 3 L stainless steel reactor. The reactor was inerted with nitrogen and heated to 80 °C. Once the reactor reached the set-point temperature two separate feeds were started simultaneously. One feed consisted of 150 g of methyl acrylate, which was fed for 330 minutes at a continuous straight feed. The second feed consisted of 2.6 grams of 2,2'-azobis 2-methylbutyronitrile, 7.9 grams of toluene (three times the weight of initiator) and 3.8 grams of dodecyl mercaptan; and this mixture was fed for 330 minutes at a continuous straight feed. After the feeds dosing were completed, the reaction was allowed to continue stirring for 2.5 hours at 80 °C. The reaction temperature was easily maintained, and no excessive heat generation was detected.

Inventive examples 2-10 were prepared in the same way as inventive example 1, except that the weight ratios of reaction components were changed according to Table 2 below.

In inventive examples 2, 4, 6, 8 and 10, an additional step where additional initiator is added at the end of the 2.5 hours hold, and the reaction is held at 80 °C for 12 hours.

For all inventive examples 1 to 10 made according to the polymerization process of the invention, the reaction temperature was easily maintained, and no excessive heat generation was detected.

TABLE 2

| Inventive Examples | | | | | | | |
|---|---|---|---|---|---|---|---|
| | | | Ex 1 | Ex 2 | Ex 3 | Ex 4 | Ex 5 |
| reaction mixture | toluene | [g] | 365 | 366 | 375 | 375 | 1438 |
| | methyl acrylate | [g] | 150 | 150 | 150 | 150 | 575 |
| | 2,2'-azobis (2-methylbutyronitrile | [wt % relative to total amount of monomers] | 1.75 | 1.75 | 3.0 | 3.0 | 3.0 |
| | dodecyl mercaptan | [wt % relative to total amount of monomers] | 2.5 | 2.5 | 4.0 | 4.0 | 6.0 |
| Additional after 2.5-hour hold | 2,2'-azobis (2-methylbutyronitrile | [wt % relative to total amount of monomers] | 0 | 0.2 | 0 | 0.2 | 0 |
| molecular weight information | $M_n$ | [g/mol] | 4,320 | 4,110 | 2,840 | 2,730 | 2,320 |
| | $M_w$ | [g/mol] | 9,990 | 9,840 | 5,700 | 5,640 | 5,170 |
| | polydispersity index | | 2.31 | 2.39 | 2.01 | 2.07 | 2.22 |
| | residual methyl acrylate | [wt % relative to total amount of monomers] | 1.01 | 0.03 | 0.63 | 0.18 | 0.97 |
| | Monomer conversion | [wt % relative to total amount of monomers] | 96.5 | 99.9 | 97.8 | 99.4 | 96.5 |
| | kinematic viscosity at 100° C. | [$mm^2/s$] | — | — | — | 1.26 | — |
| | Gelation of finished product | | no | no | no | no | no |

TABLE 2-continued

| | | | | | | | |
|---|---|---|---|---|---|---|---|
| | | | Inventive Examples | | | | |
| | | | Ex 6 | Ex 7 | Ex 8 | Ex 9 | Ex 10 |
| reaction mixture | toluene | [g] | 1462 | 1465 | 1489 | 1000 | 1000 |
| | methyl acrylate | [g] | 575 | 575 | 575 | 890 | 890 |
| | 2,2'-azobis (2-methylbutyronitrile | [wt % relative to total amount of monomers] | 3.0 | 3.0 | 3.0 | 3.0 | 3.0 |
| | dodecyl mercaptan | [wt % relative to total amount of monomers] | 6.0 | 8.0 | 8.0 | 8.0 | 8.0 |
| Additional after 2.5-hour hold | 2,2'-azobis (2-methylbutyronitrile | [wt % relative to total amount of monomers] | 0.2 | 0 | 0.2 | 0 | 0.2 |
| molecular weight information | $M_n$ | [g/mol] | 2,220 | 1,800 | 1,780 | 2,010 | 1,960 |
| | $M_w$ | [g/mol] | 5,070 | 3,810 | 3,820 | 3,820 | 3,740 |
| | polydispersity index | | 2.28 | 2.11 | 2.15 | 1.9 | 1.9 |
| | residual methyl acrylate | [wt % relative to total amount of monomers] | 0.05 | 0.78 | 0.09 | 0.31 | 0.03 |
| | Monomer conversion | [wt % relative to total amount of monomers] | 99.8 | 97.1 | 99.7 | 99.3 | 99.9 |
| | kinematic viscosity at 100° C. | [$mm^2/s$] | 1.13 | — | 0.92 | — | 3.0 |
| | Gelation of finished product | | no | no | no | no | no |

(—) not measured

Results Discussion:

Comparative Example 1 is an example of how a typical solution free radical polymerization would be carried out. Monomer is added into a reaction vessel, and once the reaction temperature is reached, an initiator is added to start the free radical polymerization. In the case of monomers such as methyl acrylate with high heats of polymerization, this monomer concentration of 25% by weight was too high for the solvent to help dissipate heat. The reaction became too hot and the reaction mixture began to evaporate, therefore the uncontrolled reaction had to be stopped.

Inventive examples 1 to 10 demonstrate an improved process to produce polymethacrylate using a reaction mixture with concentration of methyl acrylate of higher than 20% by weight, relative to the total weight of the polymerization reaction mixture.

In the inventive examples 1 to 10, the polymerizations were carried out using a feed process that dosed the monomer, chain transfer agent, and initiator over a period of time of 330 min at a constant temperature of 80 °C. No excessive heat generation was detected, and the reaction temperature was easily maintained indicating a controlled, stable process.

Residual methyl acrylate was measured on inventive examples 1 to 10, and all examples show monomer content of less than 1.1%, indicating high monomer conversion rates, namely, of greater than 96.5%, based on the total weight of the monomer composition. Inventive examples 2, 4, 6, 8, and 10 use an additional step to add a small amount of initiator and hold at the reaction temperature for an additional 12 hours. These examples show that the residual content can be lowered to less than 0.2% to achieve a monomer conversion of greater than 99.4%, based on the total weight of the monomer composition (i.e. based on the total amount of monomers).

It was also a target of the invention to achieve a product with weight average molecular weight of less than 15,000 g/mol. The polyacrylates obtained by the process of the present invention have low molecular weights and low viscosity, which makes the product handling much easier. The measured kinematic viscosities at 100 °C on inventive examples 4, 6, 8 and 10 show that the polyacrylates obtained by the process according to the invention all have viscosities of less than 10 $mm^2/s$, more specifically lower than 3.5 $mm^2/s$, showing extremely low viscosity, measured according to ASTM D445. Furthermore, it was observed that all inventive examples 1 to 10 as listed in Table 2 above obtainable by the process of the present invention have a low degree of cross-linking as shown by no visible gels in the final product.

The invention claimed is:

1. A process for preparing a polyacrylate, comprising:

(i) providing a first reaction mixture comprising a solvent or a mixture of solvents, (ii) providing a second reaction mixture comprising a monomer composition consisting of a monomer selected from the group consisting of $C_1$-$C_4$ alkyl acrylates and mixtures thereof, (iii) providing a third reaction mixture comprising a solvent or a mixture of solvents, an initiator and a chain transfer agent, (iv) initiating free radical polymerization, wherein the free radical polymerization is performed as solution polymerization by adding to the first reaction mixture of (i) the second reaction mixture of (ii) and the third reaction mixture of (iii) to obtain the polyacrylate, wherein an amount of the monomer composition is from 20% to 80% by weight, based on a total weight of the reaction mixtures of (i), (ii) and (iii), wherein the polymerization of (iv) is carried out at a reaction temperature from 50 °C to 100 °C, wherein the solvents or mixtures of solvents of (i) and (iii) are not at reflux, wherein the polyacrylate has a weight-average molecular weight in a range of 1,000 to 15,000 g/mol measured by gel permeation chromatography using poly(methyl-methacrylate) calibration standards according to DIN 55672-1.

2. The process according to claim 1, wherein the polyacrylate has a weight-average molecular weight in a range of 2,000 to 12,000 g/mol measured by gel permeation chromatography using poly(methyl-methacrylate) calibration standards according to DIN 55672-1.

3. The process according to claim 1, wherein the polyacrylate has a polydispersity index of 1.0 to 4.0.

4. The process according to claim 1, wherein the $C_1$-$C_4$ alkyl acrylates are selected from the group consisting of methyl acrylate, ethyl acrylate, n-propyl acrylate, iso-propyl acrylate, n-butyl-acrylate, iso-butyl acrylate, tert-butyl acrylate, sec-butyl acrylate, and mixtures thereof.

5. The process according to claim 4, wherein the $C_1$-$C_4$ alkyl acrylates is methyl acrylate.

6. The process according to claim 1, wherein the monomer composition is from 20% to 70% by weight based on the total weight of the reaction mixtures of (i), (ii) and (iii).

7. The process according to claim 1, wherein the first reaction mixture of (i) consists of a nonpolar solvent or a mixture thereof.

8. The process according to claim 1, wherein the third reaction mixture of (iii) comprises a chain transfer agent selected from the group consisting of n-butyl mercaptan, n-octyl mercaptan, dodecyl mercaptan, tert-dodecyl mercaptan, dodecyl mercaptan, thioglycolic acid, butylthiol glycolate, octylthiol glycolate and mixtures thereof.

9. The process according to claim 1, wherein the third reaction mixture of (iii) comprises a radical initiator selected from the group consisting of peroxide initiators, azo initiators and mixtures thereof.

10. The process according to claim 1, wherein the polymerization of (iv) further comprises addition of a radical initiator after full addition of the reaction mixtures of (ii) and (iii) to the reaction mixture of (i).

11. The process according to claim 10, wherein the amount of the radical initiator in the reaction mixture of (iii) is from 0.05% to 6.5% by weight, based on a total weight of monomers, and after full addition of the reaction mixtures (ii) and (iii) to the reaction mixture (i) in the polymerization of (iv), the polymerization of (iv) further comprises addition of 0.05% to 0.5% by weight of the radical initiator, based on the total weight of monomers.

12. The process according to claim 1, wherein the polymerization of (iv) is carried out at a reaction temperature from 60 °C to 100 °C.

13. The process according to claim 1, wherein the solvent of the first reaction mixture of (i) and the third reaction mixture of (iii) is toluene.

14. A polymethyl acrylate obtained by the process as defined in claim 1, wherein the polymethyl acrylate has a weight average molecular weight in the range of 2,000 to 12,000 g/mol, measured by gel permeation chromatography using poly(methyl-methacrylate) calibration standards according to DIN 55672-1, and a polydispersity index in the range of 1.5 to 2.5.

15. The process according to claim 1, wherein the polyacrylate has a weight-average molecular weight in a range of 3,000 to 6,000 g/mol measured by gel permeation chromatography using poly(methyl-methacrylate) calibration standards according to DIN 55672-1.

16. The process according to claim 1, wherein the monomer composition is from 20% to 60% by weight based on the total weight of the reaction mixtures of (i), (ii) and (iii).

17. The process according to claim 1, wherein the first reaction mixture of (i) consists of a hydrocarbon solvent or a mixture thereof.

* * * * *